US012187837B2

United States Patent
Loccufier et al.

(10) Patent No.: US 12,187,837 B2
(45) Date of Patent: Jan. 7, 2025

(54) ENCAPSULATED AMINE BLOCKED ISOCYANATES

(71) Applicant: AGFA NV, Mortsel (BE)

(72) Inventors: Johan Loccufier, Mortsel (BE); Luc Decoster, Mortsel (BE); Ellen Bertels, Mortsel (BE)

(73) Assignee: Agfa NV, Mortsel (BE)

( * ) Notice: Subject to any disclaimer, the term of this patent is extended or adjusted under 35 U.S.C. 154(b) by 500 days.

(21) Appl. No.: 17/624,442

(22) PCT Filed: Jun. 24, 2020

(86) PCT No.: PCT/EP2020/067633
§ 371 (c)(1),
(2) Date: Jan. 3, 2022

(87) PCT Pub. No.: WO2021/001230
PCT Pub. Date: Jan. 7, 2021

(65) Prior Publication Data
US 2022/0403090 A1   Dec. 22, 2022

(30) Foreign Application Priority Data
Jul. 4, 2019  (EP) .................................... 19184322

(51) Int. Cl.
| *C09D 11/40* | (2014.01) |
| *C08G 18/28* | (2006.01) |
| *C08G 18/80* | (2006.01) |
| *C09D 11/32* | (2014.01) |
| *C09D 11/322* | (2014.01) |
| *C09D 11/326* | (2014.01) |
| *D06P 1/642* | (2006.01) |
| *D06P 5/30* | (2006.01) |

(52) U.S. Cl.
CPC ........ *C08G 18/2865* (2013.01); *C09D 11/322* (2013.01); *C09D 11/326* (2013.01); *C09D 11/40* (2013.01); *D06P 1/6424* (2013.01); *D06P 5/30* (2013.01)

(58) Field of Classification Search
CPC ..... C09D 11/40; C09D 11/322; C09D 11/326; C09D 11/32; C08G 18/2865; C08G 18/807
See application file for complete search history.

(56) References Cited

U.S. PATENT DOCUMENTS

| 2007/0129488 A1* | 6/2007 | Dorr | .................... | C09D 175/04 |
| | | | | 524/589 |
| 2019/0023922 A1* | 1/2019 | Koyama | .............. | C08G 18/792 |

FOREIGN PATENT DOCUMENTS

| WO | WO 2018/137993 A1 | 8/2018 |
| WO | WO 2018/138069 A1 | 8/2018 |

OTHER PUBLICATIONS

European Patent Office, International Search Report in International Patent Application No. PCT/EP2020/067633, mailed Sep. 17, 2020, 3 pp.

European Patent Office, Written Opinion in International Patent Application No. PCT/EP2020/067633, mailed Sep. 17, 2020, 6 pp.

* cited by examiner

*Primary Examiner* — Michael L Leonard
(74) *Attorney, Agent, or Firm* — Leydig, Voit & Mayer, Ltd.

(57) ABSTRACT

An aqueous dispersion of a capsule composed of a polymeric shell surrounding a core, the core containing an amine blocked isocyanate, the amine blocked isocyanate comprises at least two isocyanate groups blocked by a blocking group, the blocking groups are independently from each other represented by a secondary amine. The aqueous dispersion is suitable as reactive binder chemistry in coatings and inks.

19 Claims, No Drawings

ENCAPSULATED AMINE BLOCKED ISOCYANATES

CROSS-REFERENCE TO RELATED APPLICATIONS

This patent application is the U.S. national phase of copending International Patent Application No. PCT/EP2020/067633, filed Jun. 24, 2020, which claims the benefit of European Patent Application No. 19184322.6, filed Jul. 4, 2019.

TECHNICAL FIELD

The present invention relates to encapsulated amine blocked isocyanates as reactive binding chemistry for coating and ink applications, having excellent shelf life stability.

BACKGROUND ART

In textile printing, there is a clear evolution from classical textile printing technologies such as screen printing towards digital printing. Additionally, there is a tendency to go from dye based inks to pigment based inks. Pigment based inks hold the promise of being compatible with different fibres, both natural fibres such as cellulose base fibres e.g. in cotton and synthetic fibres such as polyester and polyamide. Pigment based inks also allow to print on mixed fibre fabrics.

To bind the pigments to the different types of fibre, reactive binder technology has to be introduced into the inks. Several approaches have been disclosed in the patent literature.

WO2003/029362 discloses an ink composition comprising at least one pigment, at least one dispersed resin selected from the group consisting of acrylic acrylonitrile resins, styrene-acrylic resins, acrylic-butadiene resins, butadiene acrylonitrile resins and polyurethane resins, at least one crosslinker and a liquid medium. Melamine resins are disclosed as particularly preferred resins.

WO2005/083017 discloses an ink for textile printing comprising specific wetting agents for spreading control. The inks comprise a polyurethane as pigment dispersing agent in combination with a melamine as fixing agent.

WO2009/137753 discloses an ink composition comprising a colorant, a specific crosslinked polyurethane designed for hydrolytical stability and a post curing agent selected from the group consisting of amide and amine formaldehyde resins, phenolic resins, urea resins and blocked isocyanates, with melamine formaldehyde resins as preferred embodiment.

U.S. Pat. No. 5,853,861 discloses an ink textile combination, where the ink comprises at least on pigment and a polymer having a functional group selected from an acid, a base, an epoxy and a hydroxyl group and where the textile comprises at least one specific functional group selected from the group consisting of a hydroxyl, an amine, an amide and a carbonyl moiety and a crosslinker selected from specific organometallic compounds and isocyanates.

US2009/0226678 discloses an ink set comprising a fixing liquid and an ink comprising a pigment dispersion. The fixing agent comprises specific polymer particles with a Tg below −10° C. and a reactant, preferably a blocked isocyanate dispersion.

US2012/0306976 discloses an ink comprising a pigment, a dispersing agent for said pigment, typically an acrylate based resin, a water soluble fixing agent, typically a water soluble polymer such as a polyvinyl alcohol) derivative or a polyurethane based resin and a crosslinking agent, preferably a blocked isocyanate, where said crosslinker is capable of crosslinking said dispersant and said polymer fixing agent upon thermal treatment at a temperature of at least 100° C.

EP 29333374 discloses the use of encapsulated reactive chemistry in pigment containing aqueous inkjet inks, to manufacture printed textiles. Blocked isocyanates are disclosed as preferred reactive chemistry. Malonates have been disclosed as preferred blocking group as it is the optimal balance between reactivity and the toxicology of the blocking group. The blocking group is released in the print upon thermal fixation of the pigments, and, when having a boiling point close to or above the thermal fixation temperature, can remain as a residue in the fabric. These residues can slowly be released into the environment leading to health risks for the end user. Both methyl-ethyl-ketoxime (MEKO) and dimethylpryrrazole (DMP) are less desirable as blocking group for textile applications from a toxicological point of view. Their respective boiling points of 152.5° C. and 218° C. can lead to incomplete removal of the blocking group from the fabric upon thermal fixation. Caprolactam as blocking group requires a too high activation temperature to be compatible with a broad scope of textiles. Malonates combine sufficient reactivity without leading to toxicological hazards.

However, it has been found that encapsulated malonates upon prolonged storage in aqueous inks and liquids, slowly hydrolyse, thereby releasing carbon dioxide, resulting in pressure build up in commercial packaging and a reduced colloid stability of the inks. Long term stability is of crucial importance for industrial applications, not only during printing but also during transport in order to avoid a complex logistic chain.

Therefore, there is still a need for encapsulated blocked isocyanates, guaranteeing long term performance in combination with sufficient reactivity, while avoiding toxicological problems for the end user.

SUMMARY OF INVENTION

It is the objective of the present invention to provide a solution to the above stated problem. The objective has been achieved by providing a dispersion of encapsulated amine blocked isocyanates as binding chemistry for water based liquids as defined in claim 1.

It is a further objective of the present invention to provide an inkjet ink comprising a dispersion of encapsulated amine blocked isocyanates as defined in claim 7.

It is a further objective of the present invention to provide an aqueous coating composition comprising a dispersion of encapsulated amine blocked isocyanates as defined in claim 8.

It is another embodiment of the invention to provide a printing method using inkjet inks comprising encapsulated amine blocked isocyanates as defined in claim 11.

Other features, elements, steps, characteristics and advantages of the present invention will become more apparent from the following detailed description of preferred embodiments of the present invention. Specific embodiments of the invention are also defined in the dependent claims.

DESCRIPTION OF EMBODIMENTS

A. Self-Dispersible Capsules

A.1. Amine Blocked Isocyanates

Classic blocked isocyanates are defined as chemical components that are capable of forming isocyanates from a precursor upon thermal treatment. In general, the reaction can be summarized as given in scheme 1 below.

Scheme 1:

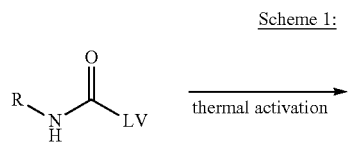

LV represents a blocking group

The objectives of the present invention are realized by encapsulation of amine blocked isocyanates, characterized that said amine blocked isocyanates are encapsulated in a core shell particle, wherein said shell, preferably comprising at least one dispersing group covalently coupled to said shell polymer, is preferably formed by interfacial polymerization and said core comprises at least one amine blocked isocyanate characterized in that said amine blocked isocyanate comprises at least two blocked isocyanate groups wherein the blocking groups are independently represented by a secondary amine according to general structure I general structure I $$H-N(R_1)(R_2)$$

wherein $R_1$ and $R_2$ are independently selected form the group consisting of substituted or unsubstituted primary, secondary or tertiary alkyl group, with the proviso that at least one of $R_1$ and $R_2$ represents a secondary or tertiary alkyl group and that $R_1$ and $R_2$ are not both a tertiary alkyl group.

In a preferred embodiment, $R_1$ and $R_2$ independently represent an unsubstituted primary, secondary or tertiary alkyl group. In an even more preferred embodiment both $R_1$ and $R_2$ represent a secondary alkyl group. In another preferred embodiment, $R_1$ represents a primary alkyl group and $R_2$ represent a tertiary or secondary alkyl group, a tertiary alkyl group being more preferred. In an even more preferred embodiment, $R_1$ and $R_2$ represent an alkyl group comprising from one to six carbon atoms and more preferably from one to four carbon atoms.

In a further preferred embodiment, said secondary amine blocking group has a boiling point of no more than 150° C., more preferably no more than 130° C. and most preferably no more than 110° C.

In another preferred embodiment, said amine blocked isocyanate has a functionality of two to six, more preferably of two to four and most preferably of two or three.

The blocked isocyanate according to the present invention is more preferably a blocked isocyanate according to general structure II General structure II

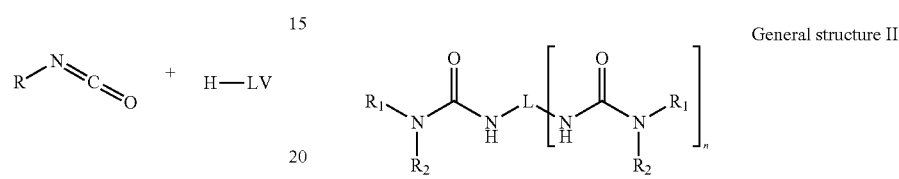

wherein

L represents an n+1 valent linking group selected from the group consisting of a group comprising no more than 40 carbon atoms and an oligomeric group selected from the group consisting of oligo-ether, an oligo-ester, an oligo-carbonate, a butadiene oligomer, a hydrogenated butadiene oligomer, an isoprene oligomer, a silicone oligomer and mixture thereof n represent an integer from 1 to 5

$R_1$ and $R_2$ are independently selected form the group consisting of substituted or unsubstituted primary, secondary or tertiary alkyl group, with the proviso that at least one of $R_1$ and $R_2$ represents a secondary or tertiary alkyl group and that $R_1$ and $R_2$ are not both a tertiary alkyl group.

In a preferred embodiment said poly-ether oligomers preferably contain 3 to 50 repeating units, more preferably 5 to 40 repeating units and most preferably 6 to 30 repeating units. Said poly-ester based oligomer preferably contains 2 to 20 repeating units, more preferably 3 to 15 repeating units and most preferably 4 to 10 repeating units. Said silicone oligomer preferably contains 3 to 40 repeating units, more preferably 5 to 30 repeating units and most preferably 6 to 20 repeating units. Said polycarbonate based oligomer preferably contains 3 to 30 repeating units, more preferably 4 to 20 repeating units and most preferably 5 to 15 repeating units. Said polybutadiene, hydrogenated polybutadiene and polyisoprene based oligomers preferably contain 3 to 50 repeating units, 5 to 40 repeating units and most preferably 6 to 30 repeating units. Oligomers containing different oligomeric repeating units preferably contain 60 repeating units or less, more preferably 50 repeating units or lees and most preferably 30 repeating units or less.

Typical examples of blocked isocyanates according to the present invention are given in Table 1 without being limited thereto.

TABLE 1
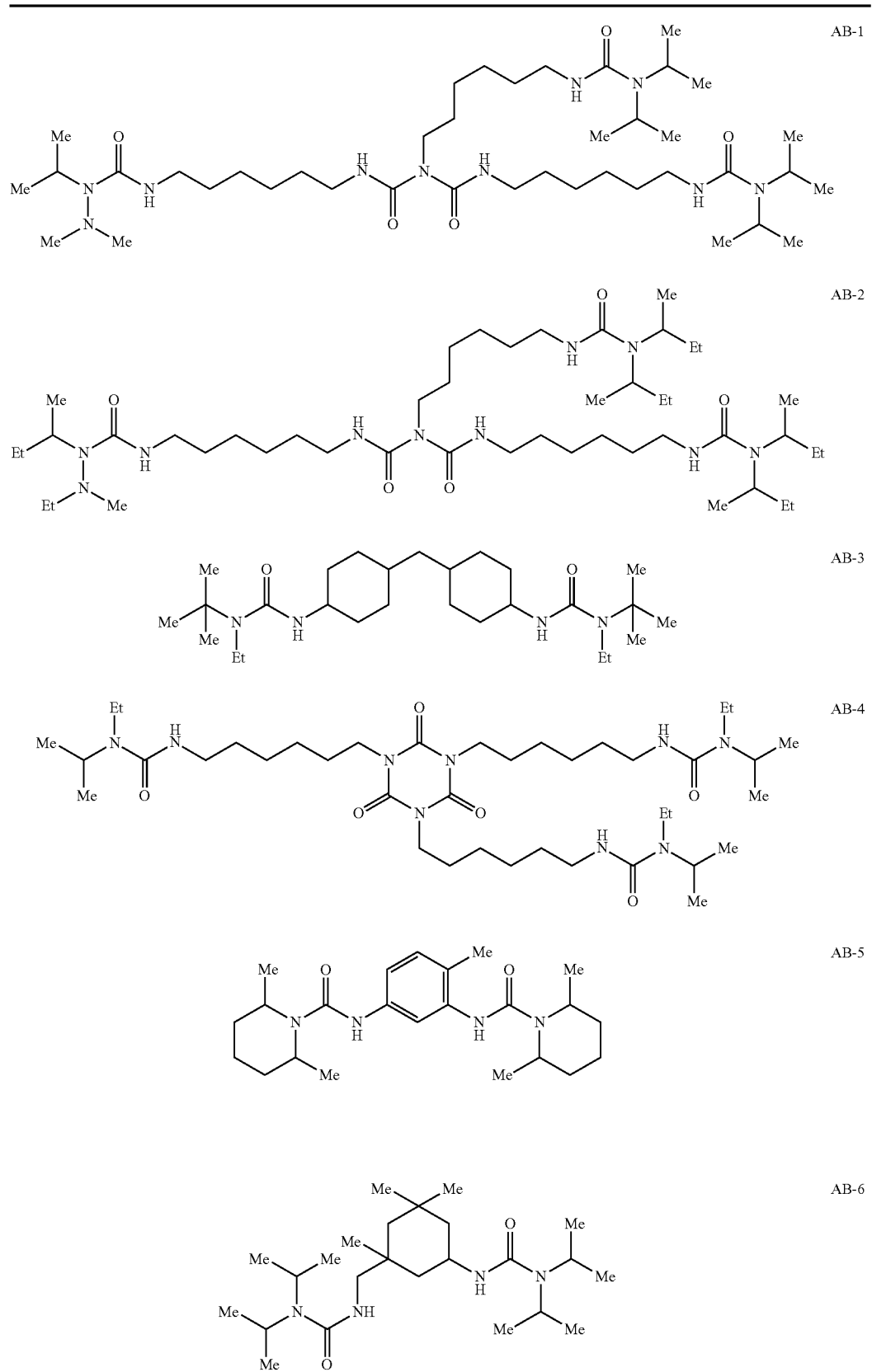

TABLE 1-continued

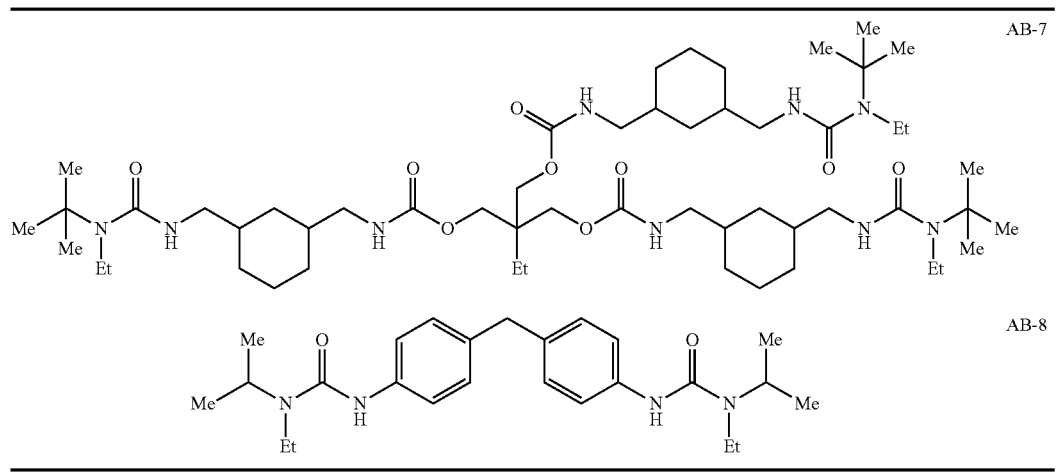

The synthesis of blocked isocyanates is well-known to the skilled person and has been reviewed by Wicks D. A. and Wicks Z. W. Jr. (Progress in Organic Coatings, 36, 148-172 (1999)) and Delebecq et al. (Chem; Rev., 113, 80-118 (2013)).

The blocked isocyanates according to the present invention can be prepared by reacting a di- or multifunctional isocyanate with a secondary amine according to general structure I, preferably in a stoichiometric ratio as illustrated below for a difunctional isocyanate.

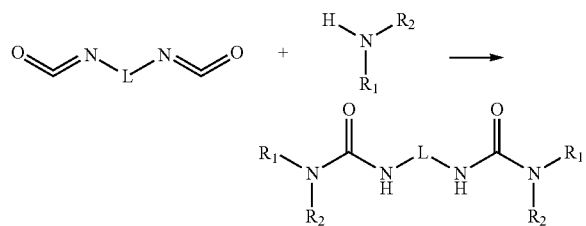

A.2. Encapsulation Technologies

The capsules according to the invention are made by an encapsulation process to encapsulate the amine blocked isocyanates.

Encapsulation is a process in which tiny particles or droplets are surrounded by a shell to give small capsules. The material inside the capsule is referred to as the core or the internal phase, whereas the shell is sometimes called a wall. This technology has been applied in different technical fields, such as self healing compositions (Blaiszik et al., Annual Review of Materials, 40, 179-211 (2010)), textile treatment (Marinkovic et al., CI&CEQ 12 (1), 58-62 (2006); Nelson G., International Journal of Pharmaceutics, 242, 55-62 (2002), Teixeira et al., AIChE Journal, 58 (6), 1939-1950 (2012)), thermal energy storage and release for buildings (Tyagi et al., Renewable and Sustainable Energy Reviews, 15, 1373-1391 (2011)), printing and recording technology (Microspheres, Microcapsules and Liposomes: Volume 1: Preparation and Chemical Applications, editor R. Arshady, 391-417 and ibid., 420-438, Citus Books, London, 1999), personal care, pharmaceuticals, nutrition, agrochemicals (Lidert Z., Delivery System Handbook for Personal Care and Cosmetic Products, 181-190, Meyer R. Rosen (ed.), William Andrew, Inc. 2005; Schrooyen et al., Proceedings of the Nutrition Society, 60, 475-479 (2001)) and electronic applications (Yoshizawa H., KONA, 22, 23-31 (2004)).

Microcapsules can be prepared using both chemical and physical methods. Encapsulation methodologies include complex coacervation, liposome formation, spray drying and precipitation and polymerisation methods. For technological applications, interfacial polymerisation is a particularly preferred technology, which has recently been reviewed by Zhang Y. and Rochefort D. (Journal of Microencapsulation, 29 (7), 636-649 (2012) and by Salaün F. (in Encapsulation Nanotechnologies, Vikas Mittal (ed.), chapter 5, 137-173 (Scrivener Publishing LLC (2013)).

In the present invention preferably a polymerization method is used, as it allows the highest control in designing the capsules. More preferably interfacial polymerization is used to prepare the capsules used in the invention. This technique is well-known and has recently been reviewed by Zhang Y. and Rochefort D. (Journal of Microencapsulation, 29 (7), 636-649 (2012) and by Salitin (in Encapsulation Nanotechnologies, Vikas Mittal (ed.), chapter 5, 137-173 (Scrivener Publishing LLC (2013)).

Interfacial polymerisation is a particularly preferred technology for the preparation of capsules according to the present invention. In interfacial polymerization, such as interfacial polycondensation, two reactants meet at the interface of the emulsion droplets and react rapidly.

In general, interfacial polymerisation requires the dispersion of an oleophilic phase in an aqueous continuous phase or vice versa. Each of the phases contains at least one dissolved monomer (a first shell component) that is capable of reacting with another monomer (a second shell component) dissolved in the other phase. Upon polymerisation, a polymer is formed that is insoluble in both the aqueous and the olephilic phase. As a result, the formed polymer has a tendency to precipitate at the interface of the oleophilic and aqueous phase, hereby forming a shell around the dispersed phase, which grows upon further polymerisation. The capsules according to the present invention are preferably prepared from an oleophilic dispersion in an aqueous continuous phase.

A.3. Polymeric Shell

Typical polymeric shells of the capsules according to the invention and formed by interfacial polymerisation are selected from the group consisting of polyamides, typically prepared from di- or oligoamines as first shell component and di- or poly-acid chlorides as second shell component, polyurea, typically prepared from di- or oligoamines as first shell component and di- or oligoisocyanates as second shell component, polyurethanes, typically prepared from di- or oligoalcohols as first shell component and di- or oligoisocyanates as second shell component, polysulfonamides, typically prepared from di- or oligoamines as first shell component and di- or oligosulfochlorides as second shell component, polyesters, typically prepared from di- or oligoalcohols as first shell component and di- or oligo-acid chlorides as second shell component and polycarbonates, typically prepared from di- or oligoalcohols as first shell component and di- or oligo-chloroformates as second shell component. The shell can be composed of combinations of these polymers.

In a further embodiment, polymers, such as gelatine, chitosan, albumin and polyethylene imine can be used as first shell components in combination with a di- or oligoisocyanate, a di- or oligo acid chloride, a di- or oligochloroformate and an epoxy resin as second shell component.

In a particularly preferred embodiment, the shell is composed of a polyurethane, a polyurea or a combination thereof. In a further preferred embodiment, a water immiscible solvent is used in the dispersion step, which is removed by solvent stripping before or after the shell formation. In a particularly preferred embodiment, the water immiscible solvent has a boiling point below 100° C. at normal pressure. Esters are particularly preferred as water immiscible solvent.

In the most preferred embodiment, the capsules are self-dispersing capsules. In order to make capsules self-dispersing, anionic dispersing groups, such as carboxylic acids or salts thereof, or cationic dispersing groups such as ammonium groups have to be coupled covalently to the polymeric shell of the capsule to guarantee the dispersion stability.

A preferred strategy to incorporate anionic stabilizing groups into the polymeric shell of a nanocapsule makes use of carboxylic acid functionalized reactive surfactants that are capable of reacting with isocyanates. This leads to an amphoteric type of surfactant containing at least partially secondary or primary amines. Other reactive surfactants functionalized with a sulfonic acid or salt thereof, a phosphoric acid ester or a salt thereof or a phosphonic acid or salt thereof can be used.

Several amphoteric surfactants, being mixtures of surfactants partially having secondary amines but also comprising tertiary amines are commercially available. Prohibitive foam formation in ink jet inks based on nanocapsules made by using the commercially available amphoteric surfactants was encountered in an inkjet printer. Foaming caused problems in the ink supply and also in the degassing for trying to remove air from the ink, thus leading to unreliable jetting. Therefore, surfactants according to Formula (I) of WO2016/165970 are preferably used during the encapsulation process of the amine blocked isocyanates.

Another preferred strategy to incorporate cationic stabilizing groups into the polymeric shell of a nanocapsule makes use of coupling a surfactant with a cationic dispersing group to the shell of the nanocapsules according to the present invention by reaction of a surfactant comprising at least one primary or secondary amine group and at least a group selected from protonated amine, a protonated nitrogen containing heteroaromatic compound, a quaternized tertiary amine, a N-quaternized heteroaromatic compound, a sulfonium and a phosphonium with an isocyanate monomer of the shell. In an even more preferred embodiment said surfactant is a surfactant according to General Formula III

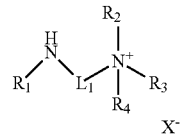

General Formula III wherein
$R_1$ is selected from the group consisting of a substituted or unsubstituted alkyl group, a substituted or unsubstituted alkenyl group and a substituted or unsubstituted alkynyl group with the proviso that $R_1$ comprises at least eight carbon atoms;

$R_2$, $R_3$ and $R_4$ are independently selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted (hetero)aryl group $L_1$ represents a divalent linking group comprising no more than eight carbon atoms;

X represents a counterion to compensate the positive charge of the ammonium group.

The capsules have an average particle size preferably of no more than 4 μm as determined by dynamic laser diffraction. The nozzle diameter of inkjet print heads is usually 20 to 35 μm. Reliable inkjet printing is possible if the average particle size of the capsules is five times smaller than the nozzle diameter. An average particle size of no more than 4 μm allows jetting of inks incorporating the dispersion of the invention by print heads having the smallest nozzle diameter of 20 μm. In a more preferred embodiment, the average particle size of the capsules is ten times smaller than the nozzle diameter. Hence preferably, the average particle size is from 0.05 to 2 μm, more preferably from 0.10 to 1 μm. When the average particle size of the capsule is smaller than 2 μm, excellent resolution and dispersion stability with time are obtained.

In a further embodiment, the aqueous medium of the dispersion of the present invention may further comprise a catalyst to activate said thermally reactive chemistry. The catalyst is preferably selected from the group consisting of a Brönsted acid, a Lewis acid and thermal acid generator. Said catalyst can be present in the aqueous continuous phase, in the core of the capsule or in a separate dispersed phase.

A.4. Solvent

The capsules according to the invention are dispersed into an aqueous medium. The aqueous medium consists of water, but may preferably include one or more water-soluble organic solvents.

The one or more organic solvents may be added for a variety of reasons. For example, it can be advantageous to add a small amount of an organic solvent to improve the dissolution of a compound in the pre-treatment liquid, inkjet ink or coating solution to be prepared. Preferable water-soluble organic solvents are polyols (e.g., ethylene glycol, glycerin, 2-ethyl-2-(hydroxymethyl)-1,3-propanediol, tetraethylene glycol, triethylene glycol, tripropylene glycol, 1,2,4-butanetriol, diethylene glycol, propylene glycol, dipropylene glycol, butyleneglycol, 1,6-hexanediol, 1,2-hexanediol, 1,5-pentanediol, 1,2-pentanediol, 2,2-dimethyl-1,3-prapanediol, 2-methyl-2,4-pentanediol, 3-methyl-1,5-pentanediol, 3-methyl-1,3-butanediol, and 2-methyl-1,3-propanediol), amines (e.g., ethanolamine, and 2-(dimethylamino)ethanol), monohydric alcohols (e.g., methanol, ethanol, and butanol), alkyl ethers of polyhydric alcohols (e.g., diethylene glycol monomethyl ether, diethylene glycol monobutyl ether, triethylene glycol monomethyl ether, triethylene glycol monobutyl ether, ethylene glycol monomethyl ether, ethylene glycol monobutyl ether, propylene glycol monomethyl ether, propylene glycol monobutyl ether, and dipropylene glycol monomethyl ether), 2,2'thiodiethanol, amides (e.g., N,N-dimethylformamide), heterocycles (e.g., 2-pyrrolidone and N-methyl pyrrolidone), and acetonitrile.

B. Aqueous Formulations Comprising the Dispersion of Encapsulated Amine Blocked Isocyanates B.1. Pre-Treatment Liquid for Textile Printing Aqueous pre-treatment liquids for treating textile fabrics before printing aqueous colorant containing inks onto the fabric may comprise the dispersion of encapsulated amine blocked isocyanates of the invention. The aqueous medium contains water, but may include one or more water-soluble organic solvents. Suitable organic solvents are described in § A.4. If present in the pre-treatment liquid, then the nanocapsules are preferably in an amount of no more than 30 wt. %, preferably between 5 and 25 wt. % based on the total weight of the pre-treatment liquid. From the encapsulated amine blocked isocyanates, the ones having a polymeric shell comprising cationic dispersing groups are particularly preferred.

The pre-treatment liquid may also contain humectants. Humectants are preferably incorporated in the pre-treatment liquid if this liquid has to be applied by means of a jetting technique such as inkjet or valve jet. Humectants prevent the clogging of nozzles. The prevention is due to its ability to slow down the evaporation rate of the pre-treatment liquid, especially the water in the liquid. The humectant is preferably an organic solvent having a higher boiling point than water. Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. A preferred humectant is glycerol.

The humectant is preferably added to the liquid formulation in an amount of 0.1 to 20 wt. % based on the total weight of the liquid.

A multivalent metal ion can be contained in the pre-treatment liquid as a flocculant for anionic colorants present in the ink subsequently applied on the substrate. Suitable examples are water-soluble metal salts formed from bi- or higher valent metal cations, such as magnesium, calcium, strontium, barium, zirconium, and aluminum, and anions, such as a fluoride ion ($F^-$), a chloride ion ($Cl^-$), a bromide ion ($Br^-$), a sulfate ion ($SO_4^{2-}$), a nitrate ion ($NO_3^-$), and an acetate ion ($CH_3COO^-$).

These polyvalent metal ions have a function of aggregating ink by acting on the carboxyl groups on the surface of the pigment in the ink jet ink, or on the dispersed polymer of nanocapsules contained in the ink. As a result, the ink remains on the surface of the textile fabric to improve the colour-developing property. Therefore, it is preferred that the surface of the pigment in the ink and/or the dispersed polymer of the nanocapsules contained in the ink have a carboxyl group.

The pre-treatment liquid may also contain organic acids as a flocculant. Preferred examples of the organic acids include, but are not limited to, acetic acid, propionic acid, and lactic acid.

The pre-treatment liquid may further contain a resin emulsion as a flocculant. Examples of the resin include, but are not limited to, starches derived from, for instance, maize and wheat; cellulosic materials such as carboxymethyl cellulose and hydroxymethyl cellulose; polysaccharide such as sodium alginate, gum arabic, locust bean gum, trant gum, guar gum, and tamarindus indica seed; proteins such as gelatine and casein; water-soluble naturally occurring polymers such as tannin and lignin; and synthetic water-soluble polymers such as polymers comprising polyvinyl alcohol, polymers comprising polyethylene oxide, polymers formed from acrylic acid monomers, and polymers formed from maleic anhydride monomers. Very suitable resins are acrylic polymers as described in EP2362014 [0027-0030]. The resin content is preferably not more than 20 wt. % relative to the total mass of the pre-treatment liquid (100 mass %).

The pre-treatment liquid may contain a surfactant. Any known surfactant may be used but preferably a glycol surfactant and/or an acetylene alcohol surfactant. The use of the acetylene glycol surfactant and/or the acetylene alcohol surfactant further reduces bleeding to improve printing quality, and also improves the drying property in printing to allow high-speed printing.

The acetylene glycol surfactant and/or the acetylene alcohol surfactant is preferably one or more selected from 2,4,7,9-tetramethyl-5-decine-4,7-diol, alkylene oxide adducts of 2,4,7,9-tetramethyl-5-decine-4,7-diol, 2,4-dimethyl-5-decin-4-ol, and alkylene oxide adducts of 2,4-dimethyl-5-decin-4-ol. These are available, for example, from Air Products (GB) as Olfine (registered trademark) 104 series and E series, such as Olfine E1 010, or from Nissin Chemical Industry as Surfynol (registered trademark) 465 and Surfynol 61.

The pre-treatment liquid may also contain pigments. Particularly useful for printing on dark textile is a pre-treatment liquid containing a white pigment. The preferred pigment for the aqueous pre-treatment liquid ink is titanium dioxide. Titanium dioxide ($TIO_2$) pigment useful in the present invention may be in the rutile or anatase crystalline form. Processes for making $TiO_2$ are described in greater detail in "The Pigment Handbook", Vol. I, 2nd Ed., John Wiley & Sons, NY (1988), the relevant disclosure of which is incorporated by reference herein for all purposes as if fully set forth.

The titanium dioxide particles can have a wide variety of average particle sizes of about 1 micron or less, depending on the desired end use application of the pre-treatment liquid. For applications demanding high hiding or decorative printing applications, the titanium dioxide particles preferably have an average size of less than about 1 μm. Preferably, the particles have an average size of from about 50 to about 950 nm, more preferably from about 75 to about 750 nm, and still more preferably from about 100 to about 500 nm.

For applications demanding white colour with some degree of transparency, the pigment preference is "nano" titanium dioxide. "Nano" titanium dioxide particles typically have an average size ranging from about 10 to about 200 nm, preferably from about 20 to about 150 nm, and more preferably from about 35 to about 75 nm. An ink comprising nano titanium dioxide can provide improved chroma and transparency, while still retaining good resistance to light fade and appropriate hue angle. A commercially available example of an uncoated nano grade of titanium oxide is P-25, available from Degussa (Parsippany N.J.).

In addition, unique advantages may be realized with multiple particle sizes, such as opaqueness and UV protection. These multiple sizes can be achieved by adding both a pigmentary and a nano grade of $TiO_2$.

The titanium dioxide is preferably incorporated into the pre-treatment formulation via a slurry concentrate composition. The amount of titanium dioxide present in the slurry composition is preferably from about 15 wt. % to about 80 wt. %, based on the total slurry weight.

The titanium dioxide pigment may also bear one or more metal oxide surface coatings. These coatings may be applied using techniques known by those skilled in the art. Examples of metal oxide coatings include silica, alumina, alumina-silica, boria and zirconia, among others. These coatings can provide improved properties including reducing the photoreactivity of the titanium dioxide. Metal oxide coatings of alumina, aluminasilica, boria and zirconia result in a positive charged surface of the $TiO_2$ pigments and hence are particularly useful in combination with the cationic stabilised capsules of the invention because no additional surface treatment of the pigment is required.

Commercial examples of such coated titanium dioxides include $R_{700}$ (alumina-coated, available from E.I. DuPont deNemours, Wilmington Del.), RDI-S (alumina-coated, available from Kemira Industrial Chemicals, Helsinki, Finland), $R_{706}$ (available from DuPont, Wilmington Del.) and W-6042 (a silica alumina treated nano grade titanium dioxide from Tayco Corporation, Osaka Japan).

A biocide may be added to the pre-treatment liquid to prevent unwanted microbial growth, which may occur in the liquid. The biocide may be used either singly or in combination. Suitable biocides for the pre-treatment liquid of the present invention include sodium dehydroacetate, 2-phenoxyethanol, sodium benzoate, sodium pyridinethion-1-oxide, ethyl p-hydroxybenzoate and 1,2-benzisothiazolin-3-one and salts thereof.

Preferred biocides are Proxel™ GXL and Proxel™ Ultra 5 available from ARCH UK BIOCIDES and Bronidox™ available from COGNIS.

A biocide is preferably added to the aqueous medium in an amount of 0.001 to 3 wt. %, more preferably 0.01 to 1.0 wt. %, each based on the ink liquid.

The pre-treatment liquid may further comprise at least one thickener for viscosity regulation in the liquid. Suitable thickeners include urea or urea derivatives, hydroxyethylcellulose, carboxymethylcellulose, hydroxypropylcellulose, derived chitin, derived starch, carrageenan, pullulan, proteins, poly(styrenesulphonic acid), poly(styrene-co-maleic anhydride), poly(alkyl vinyl ether-co-maleic anhydride), polyacrylamid, partially hydrolyzed polyacrylamid, poly (acrylic acid), poly(vinyl alcohol), partially hydrolyzed poly (vinyl acetate), poly(hydroxyethyl acrylate), poly(methyl vinyl ether), polyvinylpyrrolidone, poly(2-vinylpyridine), poly(4-vinylpyridine) and poly(diallyldimethylammonium chloride)

The thickener is added preferably in an amount of 0.01 to 20 wt. %, more preferably 0.1 to 10 wt. % based on the liquid.

The pre-treatment liquid may contain at least one pH adjuster. Suitable pH adjusters include organic amines, NaOH, KOH, $NEt_3$, $NH_3$, HCl, $HNO_3$ and $H_2SO_4$. In a preferred embodiment, the pre-treatment liquid has a pH lower than 7. A pH of 7 or less can advantageously influence the electrostatic stabilization of the capsules, especially when the dispersing groups of the nanocaps are amines.

The pre-treatment liquid may also contain an optothermal converting agent, which may be any suitable compound absorbing in the wavelength range of emission by an infrared light source. The optothermal converting agent is preferably an infrared dye as this allows easy handling into the pre-treatment liquid. The infrared dye may be included into the aqueous medium, but is preferably included in the core of the capsule. In the latter, the heat transfer is usually much more effective.

Suitable examples of infrared dyes are disclosed in [0179] of WO2015158649. The one or more optothermal converting agents are preferably present in the range of 0.1 to 10 wt. % based on the total weight of the pre-treatment liquid.

B.2. Inkjet Ink

The dispersion comprising the nanocaps of the invention is also suitable to be incorporated in aqueous ink jet inks containing a pigment. The nanocapsules are preferably present in the inkjet ink in an amount of no more than 30 wt. %, preferably between 5 and 25 wt. % based on the total weight of the ink.

B.2.1. Solvent

The aqueous medium of the ink contains water, but may preferably include one or more water-soluble organic solvents. Suitable solvents are described in § A.4.

B.2.2. Pigments

The pigments of the ink may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley-VCH, 2004. ISBN 3527305769.

Suitable pigments are disclosed in paragraphs [0128] to [0138] of WO 2008/074548.

The pigment particles are dispersed in an aqueous medium using a polymeric dispersant, an anionic surfactant, but preferably a self-dispersible pigment is used. The latter prevents interaction of the polymeric dispersant with the dispersing groups of the capsules included in the inkjet ink, since dispersion stability of the pigment can be accomplished by the same technique of electrostatic stabilization as employed for the capsules.

A self-dispersible pigment is a pigment having on its surface covalently bonded anionic hydrophilic groups, such as salt-forming groups or the same groups used as dispersing groups for the capsules, that allow the pigment to be dispersed in an aqueous medium without using a surfactant or a resin.

The technology for making self-dispersible pigments is well-known. For example, EP1220879 A discloses pigments having attached a) at least one steric group and b) at least one organic ionic group and at least one amphiphilic counterion, wherein the amphiphilic counterion has a charge opposite to that of the organic ionic group that are suitable for inkjet inks. Also EP906371A discloses suitable surface-modified coloured pigment having attached hydrophilic organic groups containing one or more ionic groups or ionizable groups. Suitable commercially available self-dispersible colour pigments are, for example, the CAB-O-JET™ inkjet colorants from CABOT.

Pigment particles in inkjet inks should be sufficiently small to permit free flow of the ink through the inkjet-printing device, especially at the ejecting nozzles. It is also desirable to use small particles for maximum colour strength and to slow down sedimentation.

The average pigment particle size is preferably between 0.050 and 1 µm, more preferably between 0.070 and 0.300 µm and particularly preferably between 0.080 and 0.200 µm. Most preferably, the numeric average pigment particle size is no larger than 0.150 µm. The average particle size of pigment particles is determined with a Brookhaven Instruments Particle Sizer BI90plus based upon the principle of dynamic light scattering. The ink is diluted with ethyl acetate to a pigment concentration of 0.002 wt %. The measurement settings of the BI90plus are: 5 runs at 23° C., angle of 90°, wavelength of 635 nm and graphics=correction function.

However, for white pigment inkjet inks, the numeric average particle diameter of the white pigment is the same as described in § B.1.

Suitable white pigments are given by Table 2 in [0116] of WO 2008/074548. The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548.

Also special colorants may be used, such as fluorescent pigments for special effects in clothing, and metallic pigments for printing a luxury look of silver and gold colours on textiles.

Suitable polymeric dispersants for the pigments are copolymers of two monomers but they may contain three, four, five or even more monomers. The properties of polymeric dispersants depend on both the nature of the monomers and their distribution in the polymer. Copolymeric dispersants preferably have the following polymer compositions:

- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

Suitable dispersants are DISPERBYK™ dispersants available from BYK CHEMIE, JONCRYL™ dispersants available from JOHNSON POLYMERS and SOLSPERSE™ dispersants available from ZENECA. A detailed list of non-polymeric as well as some polymeric dispersants is disclosed by MC CUTCHEON. Functional Materials, North American Edition. Glen Rock, N.J.: Manufacturing Confectioner Publishing Co., 1990. p. 110-129.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The pigments are preferably present in the range of 0.01 to 20%, more preferably in the range of 0.05 to 10% by weight and most preferably in the range of 0.1 to 5% by weight, each based on the total weight of the inkjet ink. For white inkjet inks, the white pigment is preferably present in an amount of 3% to 40% by weight of the inkjet ink, and more preferably 5% to 35%. An amount of less than 3% by weight cannot achieve sufficient covering power.

B.2.3. Resin

The ink jet ink composition according to the invention may further comprise a resin. The resin is often added to the ink jet ink formulation to achieve a good adhesion of the pigment to the fibres of the textile fabric. The resin is a polymer and suitable resins can be acrylic based resins, a urethane-modified polyester resin or a polyethylene wax.

The polyurethane resin is to be incorporated in the ink formulation as a dispersion and may be selected from the group consisting of aliphatic polyurethane dispersions, aromatic polyurethane dispersions, anionic polyurethane dispersions, non-ionic polyurethane dispersions, aliphatic polyester polyurethane dispersions, aliphatic polycarbonate polyurethane dispersions, aliphatic acrylic modified polyurethane dispersions, aromatic polyester polyurethane dispersions, aromatic polycarbonate polyurethane dispersions, aromatic acrylic modified polyurethane dispersions, for example, or a combination of two or more of the above.

A preferred urethane resin to be used as dispersion in the ink of the invention is a polyester resin including a structural unit containing a urethane bond. Among such resins, a water-soluble or water-dispersible urethane-modified polyester resin is preferred. It is preferable that the urethane-modified polyester resin include at least one structural unit derived from a hydroxyl group-containing polyester resin (polyester polyol) and at least one structural unit derived from an organic polyisocyanate.

Furthermore, the hydroxyl group-containing polyester resin is a resin formed by an esterification reaction or transesterification reaction between at least one polybasic acid component and at least one polyhydric alcohol component.

A preferred polyurethane resin to be included in the ink of the invention is a polyurethane resin obtainable by reacting a polyester polyol, a polyether diol, a polyol containing an anionic group and a polyisocyanate. A particular preferred polyurethane resin is a polyurethane resin obtainable by reacting a polyester polyol, a polyether diol, a polyol containing an anionic group and a polyisocyanate, and wherein the polyester polyol is obtained by reacting an aromatic polycarboxylic acid and a polyol. Examples of suitable polyurethane resins and their preparations are disclosed in the unpublished patent application EP16196224.6.

Some examples of suitable polyurethane dispersions are NEOREZ R-989, NEOREZ R-2005, and NEOREZ R-4000 (DSM NeoResins); BAYHYDROL UH 2606, BAYHYDROL UH XP 2719, BAYHYDROL UH XP 2648, and BAYHYDROL UA XP 2631 (Bayer Material Science); DAOTAN VTW 1262/35WA, DAOTAN VTW 1265/36WA, DAOTAN VTW 1267/36WA, DAOTAN VTW 6421/42WA, DAOTAN VTW 6462/36WA (Cytec Engineered Materials Inc., Anaheim CA); and SANCURE 2715, SANCURE 20041, SANCURE 2725 (Lubrizol Corporation), for example, or a combination of two or more of the above.

Acrylic based resins include polymers of acrylic monomers, polymers of methacrylic monomers, and copolymers of the aforementioned monomers with other monomers. These resins are present as a suspension of particles having an average diameter of about 30 nm to about 300 nm. The acrylic latex polymer is formed from acrylic monomers or methacrylic monomer residues. Examples of monomers of the acrylic latex polymer include, by way of illustration, acrylic monomers, such as, for example, acrylate esters, acrylamides, and acrylic acids, and methacrylic monomers, such as, for example, methacrylate esters, methacrylamides, and methacrylic acids. The acrylic latex polymer may be a homopolymer or copolymer of an acrylic monomer and another monomer such as, for example, a vinyl aromatic monomer including, but not limited to, styrene, styrene butadiene, p-chloromethylstyrene, divinyl benzene, vinyl naphthalene and divinylnaphthalene Some examples of suitable acrylic latex polymer suspensions are, JONCRYL 537 and JONCRYL 538 (BASF Corporation, Port Arthur TX); CARBOSET GA-2111, CARBOSET CR-728, CARBOSET CR-785, CARBOSET CR-761, CARBOSET CR-763, CARBOSET CR-765, CARBOSET CR-715, and CARBOSET GA-4028 (Lubrizol Corporation); NEOCRYL A-1110, NEOCRYL A-1131, NEOCRYL A-2091, NEOCRYL A-1127, NEOCRYL XK-96, and NEOCRYL XK-14 (DSM); and BAYHYDROL AH XP 2754, BAYHYDROL AH XP 2741, BAYHYDROL A 2427, and BAYHYDROL 651 (Bayer), for example, or a combination of two or more of the above.

The concentration of the resin in the ink jet ink according to the invention is at least 1 (wt.) % and preferably lower than 30 (wt.) %, more preferably lower than 20 (wt.) %.

B.2.4. Additives

The aqueous inkjet ink may further comprise a surfactant, a humectant, a biocide and a thickener as an additive. These suitable additives are described in § B.1.

B.3. Post Treatment Liquids

Aqueous liquids which comprise the dispersion of the capsules according to the invention are also suitable to be applied on printed images, hence for example after the inkjet printing step. Post treatment liquids are commonly applied to achieve a better image quality (gloss, . . . ) or improved image resistance.

The post treatment liquid may comprise beside the dispersion according to the invention also organic solvents and additives as described in § B.1.

C. Inkjet Printing Method

Printing methods using liquids such as pre-treatment liquids for textile printing, aqueous inkjet inks for colour printing on a substrate or post-treatment liquids, include at least the steps of: a) applying the liquid or ink comprising the dispersion of the capsules according to the invention onto a substrate; and b) applying heat to activate the amine blocked isocyanates in the capsule.

In a digital textile printing process of the invention, the textile fabric used is made of one type of fibre or blended fibre of two or more selected from the group consisting of cotton, hemp, rayon fibre, acetate fibre, silk, nylon fibre, and polyester fibre. The fabric may be in any form, for example, a woven, knitted, or nonwoven form of the above-mentioned fibres.

In a first step of the digital textile printing method, a pre-treatment liquid containing a flocculant is preferably applied to the fabric by spraying, coating, or pad printing. Alternatively, the pre-treatment liquid may also be applied to fabric using an ink jet head or valve jet head. These last means of applying the pre-treatment liquid has the advantage that the amount of required pre-treatment liquid is substantially lower than with the other application methods. By means of an ink jet head, it is possible to apply the pre-treatment liquid onto areas of the fabric where the image should be printed.

Preferably the pre-treatment liquid comprises the dispersion of nanocapsules according to the invention. More preferably, the nanocapsules wherein the polymeric shell contains cationic dispersing groups is to be used in the pre-treatment liquid. When the pre-treatment agent is applied to fabric with an ink jet head, the particle diameter of the nanocapsules is preferably in the range 50 nm to 1 μm when determined by light scattering. A particle diameter larger than 1 μm tends to cause a deterioration in stability of jetting from the ink jet head. The particle diameter is more preferably 500 nm or less. Suitable ink jet head types for applying the pre-treatment liquid are piezoelectric type, continuous type, thermal print head type or valve jet type. Preferable capsules are the one with a core comprising a thermally reactive crosslinker and stabilised with cationic dispersing groups.

Fabric to which the pre-treatment liquid has been applied may be dried and optionally undergo a heat treatment, before the subsequent ink jetting step with colorant containing ink. The heat treatment is preferably at 110 to 200° C., more preferably 130 to 160° C. Heating at 110° C. or higher enables the thermally reactive crosslinker in the core of the nanoparticle to be fixed to the fibres of the fabric. Examples of the heating process include, but are not limited to, heat press, atmospheric steaming, high-pressure steaming, and THERMOFIX. Any heat source can be used for the heating process; for example, an infrared ray lamp is employed.

After the application of the pre-treatment liquid of the textile fabric, a coloured image may be jetted by means of an aqueous inkjet ink containing a pigment. Preferably the inkjet ink may further comprise the dispersion of the nanocapsules according to the invention.

After the ink jetting step, the printed fabric is dried and heated. If the heating step after the pre-treatment did not occur (see above), the heating step of the printed fabric is required. The drying step can be performed at the air, but the heating step must be performed by using heat sources; examples include equipment for forced-air heating, radiation heating such as IR-radiation, including NIR- and CIR radiation, conduction heating, high-frequency drying, and microwave drying. The drying step of the fabric is carried at a temperature preferably below 150° C., more preferably below 100° C., most preferably below 80° C. The heating step is preferably at 110 to 200° C., more preferably 130 to 160° C.

Another embodiment of the inkjet printing method according to the present invention includes at least the steps of: a) jetting an inkjet ink comprising a colorant and the dispersion of the nanocapsules of the invention onto a substrate; and b) applying heat to activate the amine blocked isocyanates in the capsule. Suitable substrates are textile fabrics, leather, glass, ceramic, metallic, glass, wood, paper or polymeric surfaces. The substrate may also be primed, e.g. by a white ink.

The substrate may be porous, as e.g. textile, paper and card board substrates, or substantially non-absorbing substrates such as e.g. a plastic substrate having a polyethylene terephthalate surface.

Preferred substrates including surfaces of polyethylene, polypropylene, polycarbonate, polyvinyl chloride, polyesters like polyethylene terephthalate (PET), polyethylene naphthalate (PEN) and polylactide (PLA) and polyimide.

The substrate may also be a paper substrate, such as plain paper or resin coated paper, e.g. polyethylene or polypropylene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyethylene terephthalate sheet having a density of 1.10 g/cm$^3$ or more.

A preferred ink jet head for the inkjet printing system is a piezoelectric ink jet head. Piezoelectric inkjet jetting is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the ink jet head. However, the jetting of the ink according to the present invention is not restricted to piezoelectric inkjet printing. Other inkjet print heads can be used and include various types, such as a continuous type, a thermal print head type and a valve jet type.

If an optothermal converting agent is present in the nanocapsules of the invention, the heating mains may be a suitable light source. If the optothermal converting agent consists of one or more infrared dyes, an infrared light source is used. Any infrared light source may be used, as long as at least part of the emitted light is suitable for activating the thermally reactive crosslinker. The infrared curing means may include an infrared laser, an infrared laser diode, infrared LEDs or a combination thereof.

EXAMPLES

1. Materials

Lakeland ACP70 is a zwitterionic surfactant supplied by Lakeland Laboratories LTD.
Desmodur N75 BA is a trifunctional isocyanate supplied by Bayer AG.
Trixene BI7963 is a malonate blocked isocyanate supplied by Baxenden Chemicals LTD).
Polurene XP is a di-isopropyl malonate blocked HDI trimer biuret supplied by Sapici.
PROXEL K is a 5 w % solution of CASRN127553-58-6 in water.
QUIN-1 is a quinacridone derivative having the following structure:

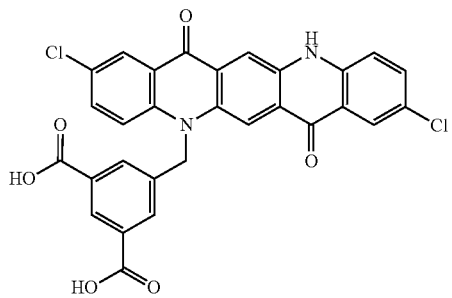 [SMILES: O=C(O)c1cc(Cn2c3ccc(Cl)cc3c(=O)c3cc4[nH]c5ccc(Cl)cc5c(=O)c4cc32)cc(C(=O)O)c1]

QUIN-1 has been prepared as disclosed in WO200706254A.
Cab-o-Jet 465 is a magenta pigment dispersion supplied by Cabot
NMDA is methyl diethanol amine supplied by Acros.
GLY is glycerol
PG is 1,2-propanediol supplied by Caldic Chemie
SURF is is a 72-76% solution of 2,4,7,9-tetramethyl-5-decyne-4,7-diol in ethyleneglycol, manufactured by Air Products & Chemicals
COL-1 is Cab-O-Jet EPD M, a PR122 pigment dispersion supplied by Cabot Corporation (14.7% pigment)
COL-2 is HSD K2, a 14-15% carbon black pigment dispersion, supplied by Diamond Dispersions 2. Measuring Methods 2.1. Average Particle Size The average particle size of the capsules in the dispersion of the invention was measured using a Zetasizer™ Nano-S (Malvern Instruments, Goffin Meyvis).

2.2. Crock Fastness

After printing and drying of the solid areas on a fabric, the dry and wet crock fastness test is done according to ISO105-X12 with a Crockmeter SDL ATLAS M238AA. The coloration of the white rubbing cloth was given as ΔE according to the Cielab color space. The lower the ΔE values, the better the crock fastness.

2.3. Stability

Stability of liquids comprising the dispersion of the invention, more particularly pressure build up on storage was evaluated as follows: The liquids such as inks were filled into 1020 ml black PE bottles. The bottles were sealed and closed. The bottles were stored at 45° C. for four weeks and visually inspected for pressure build up.

Another way to monitor the ink stability was to follow the viscosity of the liquids. The viscosity of inks was measured via two ways:

Visco-1: using a "Robotic Viscometer Type VISCObot" from CAMBRIDGE APPLIED SYSTEMS at 32° C.
Visco-2: using a Haake Rotovisco at 1000 s-1 using a 60 mm 1° cone at 32° C.

Ink stability was evaluated based on relative changes in viscosity and particle diameter after 2 weeks accelerated ageing of the inks at 60° C. If the relative change was less than 20%, stability is considered as OK (stable). If the relative change was higher than 20%, the stability is considered as not OK (unstable).

3. Synthesis of Capsule Dispersion of the Invention

Nanocap CAPINV-1

53 g of Desmodur N75 BA was dissolved in 124 g ethyl acetate. The mixture was cooled to 0° C. and a solution of 25 g di-isopropylamine in 41 g ethyl acetate was added dropwise while keeping the temperature at 0° C. The mixture was allowed to heat to room temperature and the reaction was allowed to continue for 15 minutes at room temperature. An additional 96 g Desmodur N75 BA was added.

The obtained ethyl acetate solution was added to an aqueous solution of 29 g Lakeland ACP 70, 7.5 g lysine and 10.3 g triethanol amine in 350 g water, while stirring for 8 minutes using an Ultra-Turrax at a rotation speed of 18000 rpm. The temperature was kept between 20 and 30° C.

An additional 350 ml water was added and the ethyl acetate was removed under reduced pressure while gradually decreasing the pressure from 500 mbar to 120 mbar. An additional amount of water was removed. The total weight of the dispersion was adjusted to 600 g. The dispersion was stirred at 60° C. for 24 hours. The mixture was allowed to cool down to room temperature. 2 g PROXEL K was added to the dispersion. The inventive nanocap CAPINV-1 dispersion was filtered over 1.6 μm. The average particle size was 250 μm.

Nanocap CAPINV-2

50 g of Desmodur N75 BA was dissolved in 124 g ethyl acetate. The mixture was cooled to 0° C. and a solution of 30 g di-isobutylamine in 41 g ethyl acetate was added dropwise while keeping the temperature at 0° C. The mixture was allowed to heat to room temperature and the reaction was allowed to continue for 15 minutes at room temperature. An additional 96 g Desmodur N75 BA was added.

The obtained ethyl acetate solution was added to an aqueous solution of 29 g Lakeland ACP 70, 7.5 g lysine and 10.3 g triethanol amine in 350 g water, while stirring for 8 minutes using an Ultra-Turrax at a rotation speed of 18000 rpm. The temperature was kept between 20 and 30° C.

An additional 350 ml water was added and the ethyl acetate was removed under reduced pressure while gradually decreasing the pressure from 500 mbar to 120 mbar. An additional amount of water was removed. The total weight of the dispersion was adjusted to 600 g. The dispersion was stirred at 60° C. for 24 hours. The mixture was allowed to cool down to room temperature. 2 g PROXEL K was added to the dispersion. The inventive nanocap CAPINV-2 dispersion was filtered over 1.6 μm. The average particle size was 260 μm.

4. Synthesis of the Comparative Capsule Dispersion

Nanocap CAPCOMP-1

A solution of 22 g Desmodur N75 BA and 23 g Trixene B17963 in 36.5 g ethyl acetate was prepared. This solution was added to a solution of 8 g Lakeland ACP70, 2 g L-lysine and 1 g of a 33 w % solution of sodium hydroxide in 75 g water while stirring for 5 minutes using an Ultra-Turrax at a rotation speed of 18000 rpm. The ethyl acetate was evaporated at 65° C. under reduced pressure, while gradually increasing the vacuum from 500 mbar to 120 mbar. Upon complete evaporation of the ethyl acetate, an additional 60 ml water was evaporated. Water was added to the dispersion to bring it to a total weight of 145 g. The dispersion was stirred for 16 hours at 65° C. The dispersion was allowed to cool down to room temperature. The dispersion was filtered over a 1 μm filter.

The average particle size was 180 nm.

Nanocap CAPCOMP-2

A solution of 95 g Polurene XP B25 and 91 g Desmodur N75 BA in 151 g g ethyl acetate was prepared. This solution was added to a solution of 29 g Lakeland ACP70, 7.5 g L-lysine and 10.3 g triethanol amine in 331 g water while stirring for 8 minutes using an Ultra-Turrax at a rotation speed of 18000 rpm. An additional 331 g water was added. The ethyl acetate was removed under reduced pressure while gradually decreasing the pressure from 500 mbar to 120 mbar. An additional amount of water was removed. The total weight of the dispersion was adjusted to 600 g. The dispersion was stirred at 60° C. for 24 hours. The mixture was allowed to cool down to room temperature. 2 g PROXEL K was added to the dispersion. The comparative nanocap CAPCOMP-2 dispersion was filtered over 1.6 μm. The average particle size was 220 μm.

Example 1

This example illustrates the storage stability of the encapsulated blocked isocyanates according to the present invention in comparison with malonate blocked isocyanates.

The inventive inks INV-1 and INV-2 and the comparative inks COMP-1 and COMP-2 were formulated according to Table 2. All weight percentages are based on the total weight of the ink jet ink.

TABLE 2

| Wt. % of | INV-1 | INV-2 | COMP-1 | COMP-2 |
|---|---|---|---|---|
| CAPINV-1 | 39.5 | — | — | — |
| CAPINV-2 | — | 39.5 | — | — |
| CAPCOMP-1 | — | — | 39.5 | — |
| CAPCOMP-2 | — | — | — | 39.5 |
| Glycerol | 17.5 | 17.5 | 17.5 | 17.5 |
| 1,2-propane diol | 17.5 | 17.5 | 17.5 | 17.5 |
| Cab-O-Jet 465M | 24.5 | 24.5 | 24.5 | 24.5 |
| NMDA | 1 | 1 | 1 | 1 |

The bottle of comparative ink COMP-1 bursted after 16 days. The comparative ink COMP-2 clearly built up pressure while both bottles of the inventive inks INV-1 and INV-2 remained completely intact without building up pressure.

From this experiment, it becomes apparent that the encapsulated blocked isocyanates according to the present invention guarantee a good storage stability, allowing worldwide transportation without special precautions of liquids and inks.

Example 2

This example illustrates the performance stability of the textile ink jet inks comprising encapsulated blocked isocyanates according to the present invention.

Inventive ink INV-1 was split into three samples. The first sample was stored for two weeks at 60° C., the second sample was stored for one week at 60° C. and the third sample was not artificially aged (Room Temperature).

All three samples were printed on an untreated cotton using a Dimatix™ DMP2831 system, equipped with a standard Dimatix™ 10 pl print head. The ink was jetted at 22° C., using a firing frequency of 5 kHz, a firing voltage of 25 V and a standard waveform. All three samples were jettable under standard circumstances.

The fabrics were heated at 160° C. for 5 minutes and both wet and dry crock were evaluated on the samples. The results are summarized in Table 3.

TABLE 3

|  | storage at RT | 1 week 60° C. | 2 weeks 60° C. |
|---|---|---|---|
| Dry crock | 5.4 | 5.8 | 4.8 |
| Wet crock | 14.7 | 15.5 | 15.8 |

From Table 3 it becomes apparent that the performance of the inventive ink INV-1 remains constant even after accelerated ageing at 60° C.

Example 3

This example illustrates the increased stability of the ink viscosity upon storage of the inks comprising encapsulated blocked isocyanates according to the present invention in comparison with encapsulated malonate blocked isocyanates.

Preparation of the Magenta Dispersion DISP-M2

A solution was made of 1 g NMDA, 400 mg of a 40 wt. % tetrabutyl ammonium hydroxide solution and 150 mg QUIN-1. The solution was added to a mixture of 25 g Cab-O-Jet 465M, 17.5 g glycerol and 17.5 g 1,2-propane diol. The composition was stirred for 2 hours. 40 g of different encapsulated blocked isocyanates, as given in Table 4, were added to the mixture and the inventive inks INV-3 and INV-4 and comparative ink COMP-3 were stirred for three days at room temperature.

TABLE 4

| Ink | Nanocap dispersion |
|---|---|
| INV-3 | CAPINV-1 |
| INV-4 | CAPINV-2 |
| COMP-3 | CAPCOMP-1 |

The inventive inks INV-3 and INV-4 and the comparative ink COMP-3 were stored at 45° C. for 6 weeks. The starting viscosity was measured and measured again after 6 weeks of storage at 45° C., using method visco-1 (see § 2.3). The results are summarized in Table 5.

TABLE 5

|  | Fresh (mPas) | 6 w 45° C. (mPas) |
|---|---|---|
| INV-3 | 8.25 | 9.5 |
| INV-4 | 8.5 | 9.5 |
| COMP-3 | 8.75 | 13 |

From Table 5, it becomes apparent that the inks comprising encapsulated blocked isocyanates according to the present invention are considerably more stable compared to inks comprising malonate blocked isocyanates.

Example 4

This example illustrates the increased stability of the ink viscosity and particle size upon storage of the inks comprising encapsulated blocked isocyanates according to the present invention in comparison with encapsulated malonate blocked isocyanates.

The inventive inks INV-5 and INV-6 and the comparative inks COMP-4 and COMP-5 were formulated according to Table 6. In this examples, the average particle size was measured by photon correlation spectroscopy at a wavelength of 633 nm with a 4 mW HeNe laser on a diluted sample of the ink. This was done using a Nicomp 380, available from Particle size solutions.

Table 7 displays (storage) stability of the resulting inks, based on the relative increase in particle size as well as based on the relative increase in viscosity. The viscosity was measured according to method visco-2 (see § 2.3.)

TABLE 6

| Wt. % of | INV-5 | INV-6 | COMP-4 | COMP-5 |
|---|---|---|---|---|
| CAPINV-2 | 31.14 | — | — | — |
| CAPINV-2 | — | 34.60 | — | — |
| CAPCOMP-1 | — | — | 30.41 | — |
| CAPCOMP-1 | — | — | — | 33.78 |
| GLY | 15.5 | 16.6 | 15.5 | 16.6 |
| PG | 15.5 | 16.6 | 15.5 | 16.6 |
| COL-1 | 23.81 | — | 23.81 | — |
| COL-2 | — | 21.43 | — | 21.43 |
| NMDA | 1 | 1 | 1 | 1 |
| WATER | To complete to 100% | | | |

Table 7 illustrates that the comparative inks COMP-4 and COMP-5 are less stable compared to inventive inks INV-5 and INV-6. Those results show the increased stability latitude of inks based on the invention.

TABLE 7

Storage stability

| Ink | Viscosity | Particle size |
|---|---|---|
| INV-5 | OK | OK |
| INV-6 | OK | OK |
| COMP-4 | NOK | NOK |
| COMP-5 | NOK | NOK |

The invention claimed is:

1. An aqueous dispersion of a capsule composed of a polymeric shell surrounding a core, the core containing an amine blocked isocyanate according to General Structure II:

General Structure II

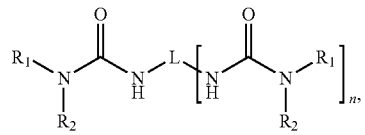

wherein

R$_1$ and R$_2$ each independently represent a substituted or unsubstituted primary, secondary, or tertiary alkyl group, with the proviso that at least one of R$_1$ and R$_2$ represents a substituted or unsubstituted secondary or tertiary alkyl group and that R$_1$ and R$_2$ are not both a tertiary alkyl group, L represents an n+1 valent linking group selected from a group comprising no more than 40 carbon atoms and an oligomeric group selected from an oligo-ether, an oligo-ester, an oligo-carbonate, a butadiene oligomer, a hydrogenated butadiene oligomer, an isoprene oligomer, a silicone oligomer, and mixture thereof, and n represent an integer from 1 to 5.

2. The aqueous dispersion of claim 1, wherein both R$_1$ and R$_2$ represent a secondary alkyl group.

3. The aqueous dispersion of claim 1, wherein a dispersing group is covalently bonded to the polymeric shell.

4. The aqueous dispersion of claim 2, wherein a dispersing group is covalently bonded to the polymeric shell.

5. The aqueous dispersion of claim 3, wherein the dispersing group is selected from the group consisting of a carboxylic acid or salt thereof, a sulfonic acid or salt thereof, a phosphoric acid ester or a salt thereof, and a phosphonic acid or salt thereof.

6. The aqueous dispersion of claim 4, wherein the dispersing group is selected from the group consisting of a carboxylic acid or salt thereof, a sulfonic acid or salt thereof, a phosphoric acid ester or a salt thereof, and a phosphonic acid or salt thereof.

7. The aqueous dispersion of claim 3, wherein the dispersing group is selected from the group consisting of a protonated amine, a protonated nitrogen containing heteroaromatic compound, a quaternized tertiary amine, a N-quaternized heteroaromatic compound, a sulfonium, and a phosphonium.

8. The aqueous dispersion of claim 4, wherein the dispersing group is selected from the group consisting of a protonated amine, a protonated nitrogen containing heteroaromatic compound, a quaternized tertiary amine, a N-quaternized heteroaromatic compound, a sulfonium, and a phosphonium.

9. An aqueous inkjet ink comprising a pigment and the aqueous dispersion of claim 1.

10. An aqueous inkjet ink comprising a pigment and the aqueous dispersion of claim 5.

11. An aqueous inkjet ink comprising a pigment and the aqueous dispersion of claim 6.

12. An aqueous pre-treatment liquid for textile printing comprising a flocculant and the aqueous dispersion of claim 7.

13. An aqueous pre-treatment liquid for textile printing comprising a flocculant and the aqueous dispersion of claim 8.

14. A fluid set for textile printing comprising an aqueous pre-treatment liquid containing a flocculant and the aqueous inkjet ink of claim 9.

15. A fluid set for textile printing comprising an aqueous pre-treatment liquid containing a flocculant and the aqueous inkjet ink of claim 10.

16. A fluid set for textile printing comprising an aqueous pre-treatment liquid containing a flocculant and the aqueous inkjet ink of claim 11.

17. An inkjet printing method including the steps of:
   a) jetting the inkjet ink of claim 9 on a substrate, and
   b) applying heat to activate the amine blocked isocyanate in the capsule.

18. The inkjet printing method of claim 17, wherein prior to step a), an aqueous pre-treatment liquid is applied to the substrate, the substrate being a textile fabric.

19. The inkjet printing method of claim 18, wherein the pre-treatment liquid is applied via a jetting process.

* * * * *